3,366,494
PRESSURIZED AEROSOL FOOD EMULSIONS
Frank A. Bower, Woodstown, N.J., John H. Fassnacht, Newark, Del., and Aloysius J. Knipper, Ramsey, N.J., assignors to E. I. du Pont de Nemours and Company, Wilmington, Del., a corporation of Delaware
No Drawing. Continuation-in-part of application Ser. No. 367,211, May 13, 1964. This application Feb. 15, 1967, Ser. No. 617,016
5 Claims. (Cl. 99—189)

ABSTRACT OF THE DISCLOSURE

Water based food emulsions which when dispersed from aerosol dispensing containers form stable foam compositions resistant to collapse and draining over extended periods of time. The novel foamed foods are useful in preparing attractive and appetizing dishes from foods which heretofore could not be packaged or sold in aerosol containers with commercially successful results.

Cross reference to related applications

This application is a continuation-in-part of our copending application, Ser. No. 367,211, filed May 13, 1964, now abandoned.

Background of invention

It has not been possible heretofore to dispense all types of water based fluid foodstuffs from aerosol packages in foam form. Many such foodstuffs have either failed to form foams or have formed unstable foams which collapsed and drained upon standing. Indeed, it has heretofore been difficult to produce satisfactory foams of any type from foods with low fat levels.

Description of the invention

More specifically, the present invention is directed to a food mixture comprising (a) water based fluid foodstuff, (b) an emulsion of the oil-in-water type consisting essentially of 15% to 80% aqueous phase, 20% to 75% edible fatty oil and 0.1% to 12% edible emulsifier, and (c) an aerosol propellant safe for human consumption. Component (b) is added to the water based food in amounts from 10% to 40% by weight of the total weight of components (a) and (b). The exact amount of component (b) added to the mixture is adjusted so that the product obtained from the combination of (a) and (b) does not contain in excess of 10% by weight oil. The food mixture is then mixed with sufficient component (c) to dispense the food mixture from an aerosol container.

The present invention is also directed to a package comprising an aerosol container, closed with an aerosol dispensing valve, and containing the above-described food mixture.

The present invention is further directed to a method for preparing the above-described low fat food mixtures for dispensing from an aerosol container.

The above-defined food mixture consists of three essential components, namely, a water based fluid foodstuff, an oil-in-water emulsion, and a propellant. The water based food-stuff utilized in this invention may be of any type which is desired as an aerosol foam or whipped product. Many such foods are discussed in U.S.P. 2,849,323 and U.S.P. 2,952,547. In general, these food products include semi-solid salad dressings, whipped creams, natural or synthetic flavors such as lemon oil, lime oil, and cinnamon oil, cheese spreads, and sour cream formulations, catsups and like products which can be easily dispensed in whipped form. While the mixture of this invention is not limited to any particular type of water based food, it will be apparent to those skilled in the art that the water based foodstuff must have sufficient fluidity to be dispensable in an aerosol dispensing system. It is preferred, therefore, that the final food-emulsion mixture, prior to being charged into the aerosol container, should have a viscosity from 1 to 1500 centistokes. Further, it will also be apparent to those skilled in the art that many water based foods are not desirable in foamed or whipped form. The term "water based foods" means, for the purposes of this invention, foodstuffs having water as a major constituent. The foodstuff may be a solution, dispersion or emulsion of other materials in water. When the foodstuff is an emulsion, it is understood that water is the continuous phase.

The oil-and-water emulsion is added to the water based foodstuff to render it foamable when dispensed from an aerosol dispensing package. Foods which do not ordinarily form foams alone or with an emulsifying agent will form foams when they contain the oil-in-water emulsion of this invention, provided they are prepared according to the procedure of this invention. The emulsion of this invention consists of 15% to 80% aqueous phase, 20% to 75% edible fatty oil and 0.1% to 12% edible emulsifier. The aqueous phase consists of either water or sugar syrups and may contain any flavors, colors, additives, stabilizers such as microcrystalline cellulose or the like which are desired for the particular food formulation. The edible fatty oil may be any fatty oil fit for human consumption. For best results, the fatty oil should be a solid or semi-solid product such as hydrogenated vegetable oil, coconut oils and other solid fats. Blends of solid and liquid oils are advantageous for some foods.

The emulsifier may be any emulsifier safe for human consumption, i.e., those approved by the U.S. Food and Drug Administration. Examples of such emulsifiers are the diacetyl tartaric acid esters of mono- and diglycerides, mono- and diglycerides of fatty acids, monosodium phosphate esters of mono- and diglycerides, lactic acid esters of mono- and diglycerides, polyoxyethylene (20) sorbitan tristearate, polyoxyethylene (20) sorbitan monooleate, propylene glycol alginate, acetylated monoglycerides, hydrolylated lecithin, sorbitan monostearate, polyoxyethylene (20) sorbitan monostearate, stearyllactic acid, carrageenin, sodium salts of fatty acids, stearyl monoglyceride citrate, propylene glycol esters of fatty acids, polyglycerol esters of fatty acids and lecithin.

Usually, but not necessarily, a blend of two or more emulsifiers is used for the best results. Added stabilizers may be required for special effect, for example, soluble vegetable gums, water-soluble polymers such as carboxymethyl cellulose, gelatin, starch, sodium caseinate or insoluble cellulose derivatives such as microcrystalline cellulose.

The low oil food formulations of this invention, in order to be commercially desirable, must be formed by combining the components in a particular sequence. The random combining of the components does not result in the highly stable, low fat or oil food formulations of this invention. It is believed that various conditions, such as the concentration of the individual ingredients during mixing and the temperatures at which the mixing is carried out, are responsible for the inability to make a desirable product by the random combining of the ingredients.

The precise method, therefore, for forming the desirable food formulations consists of three major steps, namely, (1) premixing the oil, water or syrup and emulsifier to form a homogenized emulsion, (2) thereafter combining the emulsion with the water based foodstuff, and (3) adding the propellant to the prepared food-emulsion mixture. More particularly, this method of preparation is illustrated by carrying out the following steps. The edible oil and emulsifier are combined to form a single oily phase. When the oil is a solid or semi-solid, it is melted together with the emulsifier to form the oily phase.

The water, or sugar syrup, containing any desired additives, is heated to about the melting point of the oil-emulsifier blend. The water or syrup and oily phase are mixed and homogenized to form an emulsion. Sufficient water or syrup must be used to insure that the emulsion is of the oil-in-water type. Generally, a mixture containing 15% to 80% by weight water and 20% to 75% edible oil forms an oil-in-water emulsion. Sufficient emulsifying agent is used to form a stable emulsion. Although from 0.1% to 12% emulsifying agent may be used, from 4% to 12% is preferred in most cases. The thus formed emulsion is then blended with the water based foodstuff until a uniform mixture is obtained. In general, from 10% to 40% emulsion, based on the combined weight of the food-emulsion mixture, is used to prepare the final food product. The amount of emulsion used depends on the food, the effect desired, and the necessity to maintain the fat or oil level in the food below 10% by weight. Fat concentrations above 10% are undesirable since they will often impart a fat or oil taste to the food. The food formulation is now ready to place in the aerosol container. The foodstuff-emulsion mixture can be prepared in advance and stored for later use if so desired. When ready to prepare the aerosol formulation, the foodstuff-emulsion mixture is charged into a standard aerosol can or container. The can is then sealed with a commercially available aerosol food valve specifically designed for dispensing foodstuffs as foams. The sealed aerosol can is then charged with sufficient propellant to completely discharge the contents of the can.

A number of aerosol propellants are known but only a restricted number are suitable and safe for use with foodstuffs for human consumption. These include octafluorocyclobutane, chloropentafluoroethane, decafluorobutane, and mixtures thereof, and mixtures of octafluorocyclobutane, decafluorobutane, and chloropentafluoroethane with nitrous oxide or carbon dioxide as described in U.S. Pat. 2,849,323 and U.S. Pat. 2,952,547. Although all of these propellants are useful, decafluorobutane, octafluorocyclobutane and particularly the mixtures of octafluorocyclobutane with nitrous oxide or carbon dioxide as hereinbefore described are preferred.

The examples below illustrate the practice of the present invention but are not meant to be limiting. All percentages are by weight unless otherwise specified.

*Example 1*

A foamable fruit whip mixture is prepared with the following ingredients.

An emulsion of the oil-in-water type is first prepared with the following proportions:

| Emulsion Formulation | Weight percent |
|---|---|
| (1) Water | 46.5 |
| (2) Microcrystalline cellulose (20% in water) | 25.0 |
| (3) Vegetable oil (M.P. 92° F.) | 23.5 |
| (4) Glyceryl lactostearate | 4.5 |
| (5) Polyoxyethylene (20) sorbitan monooleate | 0.5 |

Items 2, 4, and 5 are the emulsifier; item 1 constitutes the aqueous phase, and 3 the edible fatty oil. Items 3 to 5 are melted together and the resulting mixture is then combined with water and microcrystalline cellulose and heated at 100° F. and homogenized at about 1000 p.s.i.

The above-produced emulsion is combined with commercial raspberry purée in the following weight proportions to obtain a foamy aerosol raspberry whip:

| | Percent |
|---|---|
| Raspberry purée | 74.4 |
| Emulsion | 18.6 |
| Octafluorocyclobutane | 7.0 |

The raspberry purée and the emulsion are combined with good mixing. The mixture is added to a standard aerosol can which is then sealed with a standard food aerosol foam valve. The container is then pressure loaded with sufficient octafluorocyclobutane to equal 7.0% by weight of the mixture.

This product dispenses as an attractive whipped product of good taste and color which is stable to collapse and draining for a long period. Substitution of other fruit products of similar consistency for the raspberry purée leads to similar fruit whips. Decafluorobutane, chloropentafluoroethane, or octafluorocyclobutane mixtures with nitrous oxide or carbon dioxide when substituted for the octafluorocyclobutane propellant above give similar results.

*Example 2*

A whipped cola syrup is prepared with the following ingredients.

The same emulsion formulation is prepared in accordance with the procedure used in Example 1.

The prepared emulsion is then combined with the cola syrup and propellant in the following proportions:

| | Percent |
|---|---|
| Cola flavored syrup | 55.8 |
| Emulsion | 14.9 |
| Corn syrup | 22.3 |
| Octafluorocyclobutane | 7.0 |

The corn syrup and cola syrup are first completely mixed. The emulsion is then added and the mixture homogenized at 1000 p.s.i. The resulting mixture is loaded into a standard aersol can which is then sealed with a standard aerosol food foam valve. Octafluorocyclobutane is then loaded into the can. The product dispenses as a foamed or whipped cola product of good taste, color and stability to collapse or drainage.

*Example 3*

A honey whip is prepared with the following ingredients.

An emulsion of the oil-in-water type is first prepared with the following proportions:

| Emulsion formulation: | Weight percent |
|---|---|
| (1) Water | 21.5 |
| (2) Microcrystalline cellulose (20% in water) | 50.0 |
| (3) Vegetable oil (M.P. 92° F.) | 23.5 |
| (4) Stearyllactic acid— Monoglyceride emulsifier [1] Diglyceride emulsifier [1] | 4.5 |
| (5) Polyoxyethylene (20) sorbitan monooleate | 0.5 |

[1] Available as "SGM-57" from Durkee Famous Foods, Jamaica, N.Y.

Item 3, 4, 5 are first melted together and then combine with previously combined items 1 and 2 with good stirring. The resulting mixture is homogenized at 1000 p.s.i.

The prepared emulsion is then combined with the honey and propellant in the following weight proportions:

| | Percent |
|---|---|
| Honey | 74.4 |
| Emulsion | 18.6 |
| Octafluorocyclobutane | 7.0 |

The honey and emulsion are combined with good stirring and added to a standard aerosol can. The can is sealed with a standard aerosol food foam valve and the octafluorocyclobutane is pressure loaded into the can. The product is dispensed as a whipped honey of good appearance, taste, color and stability to collapse and drainage.

*Example 4*

A pineapple-honey whip is prepared with the following ingredients.

An emulsion of the oil-in-water type is first prepared with the following proportions:

Emulsion formulation:                              Weight percent
  (1) Water _____ 21.5
  (2) Microcrystalline cellulose (20% in water) 50.0
  (3) Vegetable oil (M.P. 110° F.) _____ 23.5
  (4) Stearyllactic acid—
      Monoglyceride emulsifier [1]
      Diglyceride emulsifier [1]    } -------- 4.5
  (5) Polyoxyethylene (20) sorbitan monooleate _ 0.5

[1] Available as "SGM-57" from Durkee Famous Foods, Jamaica, N.Y.

Items 3, 4, and 5 are melted together and then combined with previously combined items 1 and 2 with good mixing. The resulting mixture is homogenized at 1000 p.s.i.

The above-prepared emulsion is then combined with the pineapple, honey, and propellant in the following proportions:

|  | Percent |
|---|---|
| Honey | 52.1 |
| Lemon juice | 12.7 |
| Crushed pineapple | 9.5 |
| Salt | 0.2 |
| Emulsion | 18.5 |
| Octafluorocyclobutane | 7.0 |

The crushed pineapple is finely divided in a Waring blender for five minutes, then blended with the honey, lemon junce, salt and emulsion. The resulting mixture is added to a standard aerosol can and the latter is sealed with a standard aerosol foam valve. Octafluorocyclobutane is then pressure loaded into the can. The product dispenses as a whipped material of good appearance, taste, color and stability to collapse and drainage.

When a propellant mixture of octafluorocyclobutane and chloropentafluoroethane is substituted for the octafluorocyclobutane propellant above, similar results are obtained.

*Example 5*

A whipped corn syrup is prepared with the following ingredients.

Using the emulsion prepared in Example 1, a whipped corn syrup product is prepared according to the formulation below:

Aerosol whipped syrup formulation:   Weight percent
  Corn syrup _____ 80.4
  Emulsion _____ 11.2
  Vanilla extract _____ 1.4
  Octafluorocyclobutane _____ 7.0

The corn syrup, emulsion and vanilla extract are combined with good mixing and added to a standard aerosol can. The can is sealed with a standard aerosol food foam valve and the octafluorocyclobutane is pressure loaded. The product dispenses as a stable, whipped corn syrup of good appearance and taste.

In addition to the above-disclosed formulations, aerosol whipped formulations have also been prepared from marshmallow, sour cream, mayonnaise, salad dressing, flavored toppings, cream cheese, cordials, and catsup, using emulsions equivalent to those of the above examples. In every case, satisfactory foamed products were obtained, provided the fat or oil level of the final food composition was maintained below 10% by weight.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments described herein except as defined in the appended claims.

The embodiments of the invention in which an exclusive property or privilege is claimed are defined as follows:

1. A food mixture confined under pressure in an aerosol container comprising
  (A) a water based fluid foodstuff,
  (B) an emulsion of the oil-in-water type consisting essentially of 15% to 80% water or sugar syrup, 20% to 75% edible fatty oil, and 0.1% to 12% edible emulsifier, and
  (C) an aerosol propellant selected from the group consisting of octafluorocyclobutane, decafluorobutane, chloropentafluoroethane, mixtures of said fluorinated propellants and mixtures of propellants consisting of one or more of said fluorinated propellants with nitrous oxide, said component (B) being from 10% to 40% by weight of the total weight of components (A) and (B) and said mixture containing sufficient component (C) to dispense said mixture from an aerosol container; with the proviso that less than 10% by weight of the total weight of components (A) and (B) is oil.

2. The food mixture of claim 1 wherein decafluorobutane is the propellant.

3. A food mixture of claim 1 wherein the emulsion of the oil-in-water type consists essentially of 15% to 80% water, 20% to 75% edible fatty oil, and 0.1% to 12% edible emulsifier.

4. A process for preparing the aerosol dispensable food composition of claim 1 comprising premixing and blending into a homogeneous phase an edible emulsifier, edible oil, and sufficient water to form an emulsion of the oil-in-water type, thereafter mixing said emulsion with a water base food, and charging the resulting mixture into an aerosol-dispensing container with sufficient propellant to dispense said mixture from said aerosol container; the proportions of the ingredients of said emulsion, the resulting mixture and the propellant employed being those set forth in claim 1.

5. A process for preparing an aerosol dispensing food package of claim 3 which comprises premixing and blending into a homogeneous phase an edible emulsifier, edible oil and sufficient water to form an emulsion of the oil-in-water type, thereafter mixing said emulsion with a water base food, and charging said food-emulsion mixture into an aerosol dispensing container with sufficient aerosol propellant to dispense said mixture from said aerosol container; the proportions of the ingredients of said emulsion, food-emulsion mixture and propellant employed being those set forth in claim 3.

References Cited

UNITED STATES PATENTS 2,844,469    7/1958    Melnick _____ 99—144
2,849,323    8/1958    Young _____ 99—189

RAYMOND N. JONES, *Primary Examiner.*